United States Patent
Ishioka et al.

(10) Patent No.: US 11,299,163 B2
(45) Date of Patent: Apr. 12, 2022

(54) CONTROL SYSTEM OF VEHICLE, CONTROL METHOD OF THE SAME, AND NON-TRANSITORY COMPUTER-READABLE STORAGE MEDIUM

(71) Applicant: HONDA MOTOR CO., LTD., Tokyo (JP)

(72) Inventors: Atsushi Ishioka, Wako (JP); Kanta Tsuji, Wako (JP); Yuichi Komori, Wako (JP); Daiki Nishida, Wako (JP); Takafumi Hirose, Wako (JP); Tadashi Naruse, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 216 days.

(21) Appl. No.: 16/728,450

(22) Filed: Dec. 27, 2019

(65) Prior Publication Data
US 2020/0216074 A1   Jul. 9, 2020

(30) Foreign Application Priority Data

Jan. 8, 2019 (JP) .............................. JP2019-001354

(51) Int. Cl.
*B60W 30/18* (2012.01)
*B60W 60/00* (2020.01)
(Continued)

(52) U.S. Cl.
CPC ....... *B60W 30/18163* (2013.01); *B60Q 1/346* (2013.01); *B60Q 5/005* (2013.01); *B60W 60/0055* (2020.02); *B60W 2552/00* (2020.02)

(58) Field of Classification Search
CPC ....... B60W 30/18163; B60W 60/0055; B60W 2552/00; B60W 60/0053; B60Q 5/005; B60Q 1/346; B60Q 1/46
See application file for complete search history.

(56) References Cited

U.S. PATENT DOCUMENTS

| 5,774,069 A | 6/1998 | Tanaka et al. |
| 2020/0039584 A1* | 2/2020 | Igarashi ................ B60W 50/14 |

FOREIGN PATENT DOCUMENTS

| JP | H09-161196 A | 6/1997 |
| JP | 2000-276690 A | 10/2000 |

(Continued)

OTHER PUBLICATIONS

Machine translation of Hirata et al (JP2018/144720) (Year: 2018).*
(Continued)

*Primary Examiner* — Alan D Hutchinson
(74) *Attorney, Agent, or Firm* — Westerman, Hattori, Daniels & Adrian, LLP

(57) ABSTRACT

A control system of a vehicle determines whether to require a shift from a first travel state in which an operation by a driver is not required to a second travel state in which the operation by the driver is required; makes an operation request to the driver when the shift is required; determines whether the driver has performed an operation in response to the request; and stops the vehicle in a predetermined position when the driver has not performed the operation, wherein in a case in which a lane change operation is required to stop the vehicle in the predetermined position, a speed of travel of the self-vehicle is reduced in accordance with each of a vehicle speed set for a first lane before the lane change operation and a vehicle speed set for a second lane after the lane change operation.

16 Claims, 8 Drawing Sheets

(51) Int. Cl.
*B60Q 5/00* (2006.01)
*B60Q 1/34* (2006.01)

(56) References Cited

FOREIGN PATENT DOCUMENTS

| | | |
|---|---|---|
| JP | 2007-145313 A | 6/2007 |
| JP | 2018-144720 A | 9/2018 |
| WO | 2018/111877 A1 | 6/2018 |

OTHER PUBLICATIONS

Office Action dated Jun. 11, 2021, issued in counterpart JP Patent Application No. 2019-001354, with Partial English translation. (8 pages).
Office Action dated Nov. 9, 2020, issued in counterpart JP Application No. 2019-001354, with Partial English Translation. (7 pages).

* cited by examiner

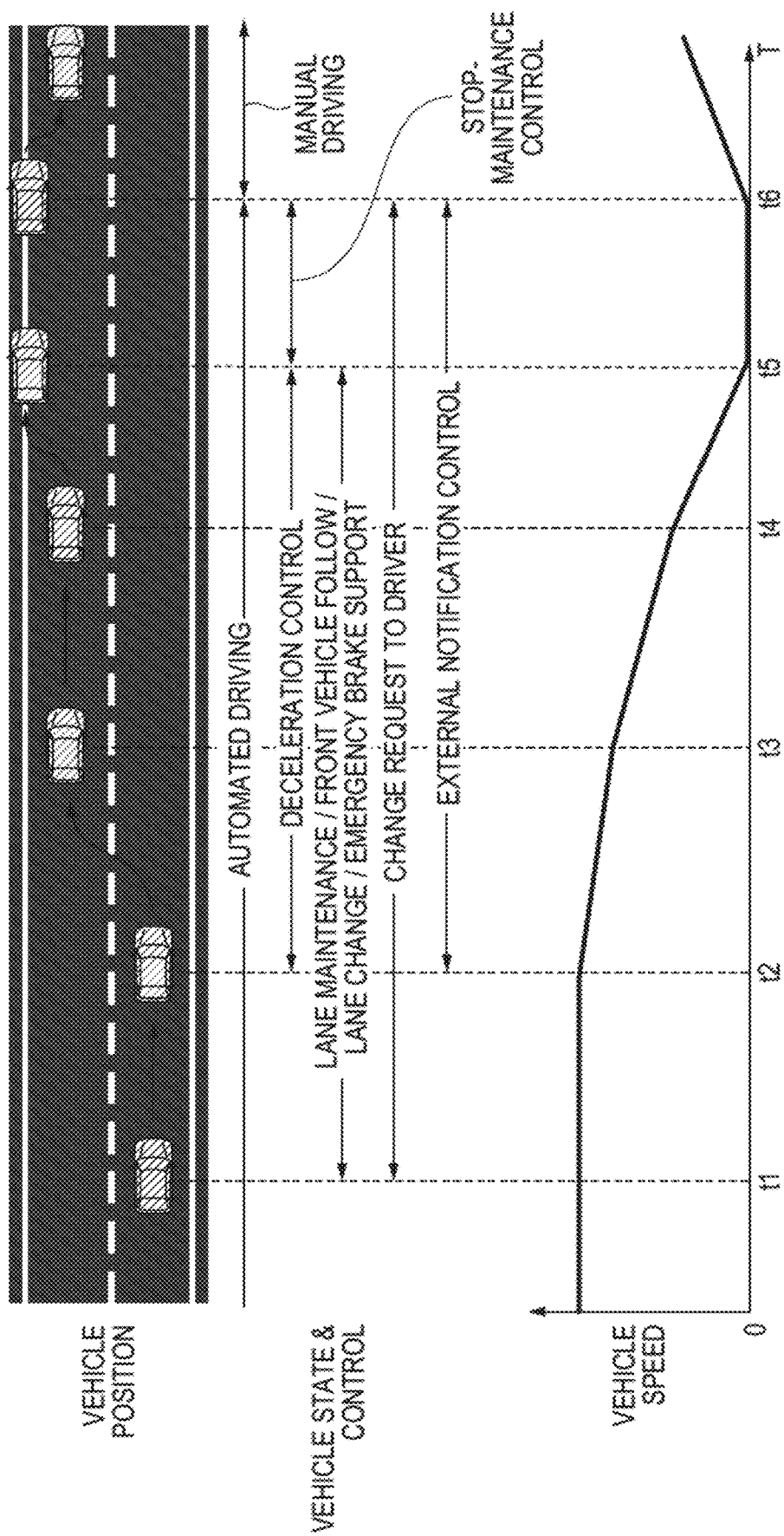

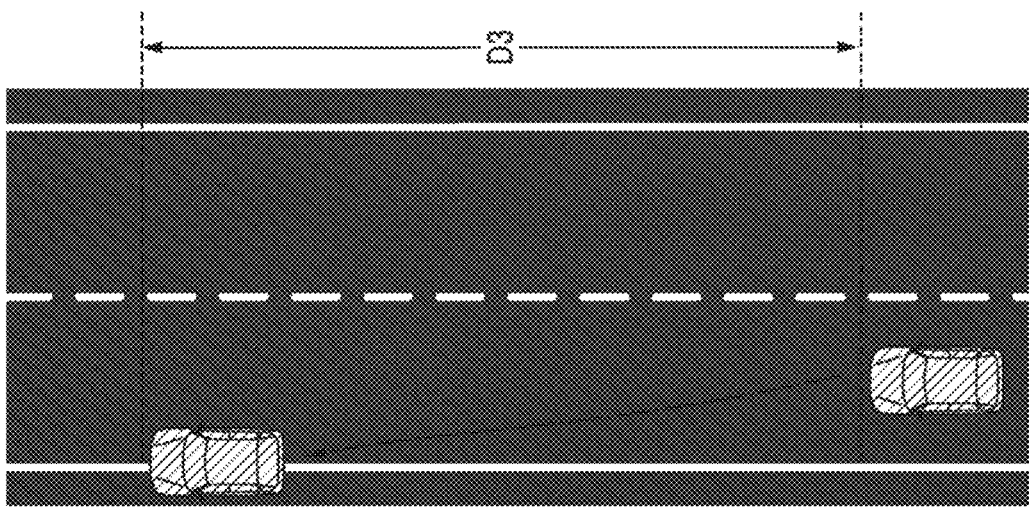
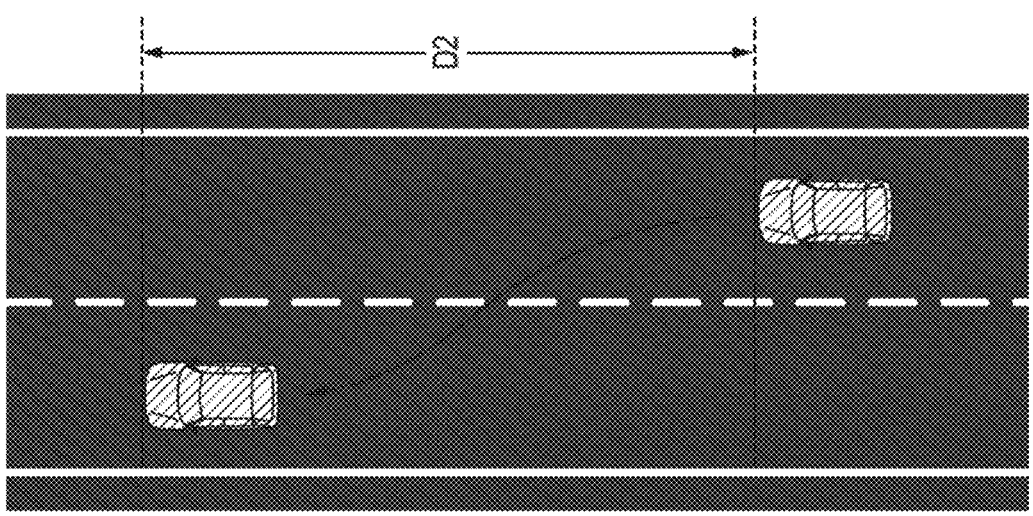
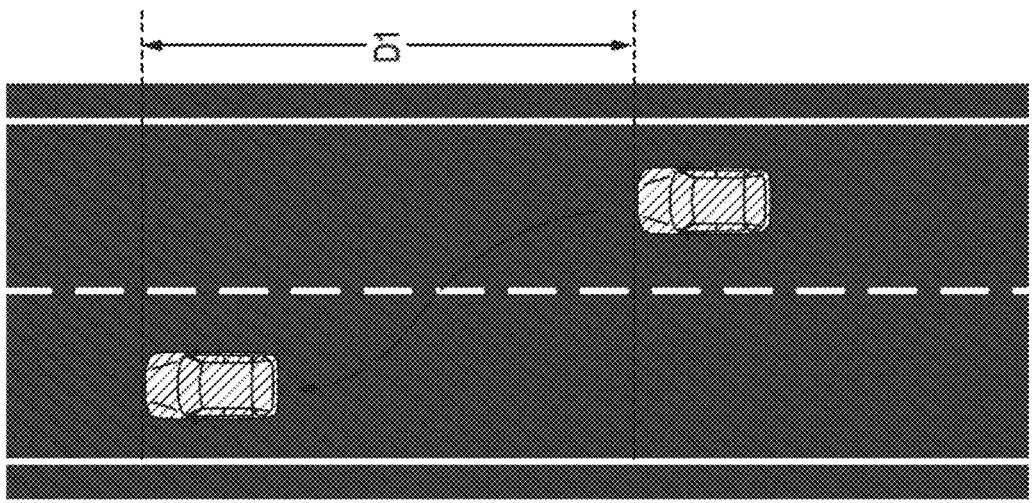

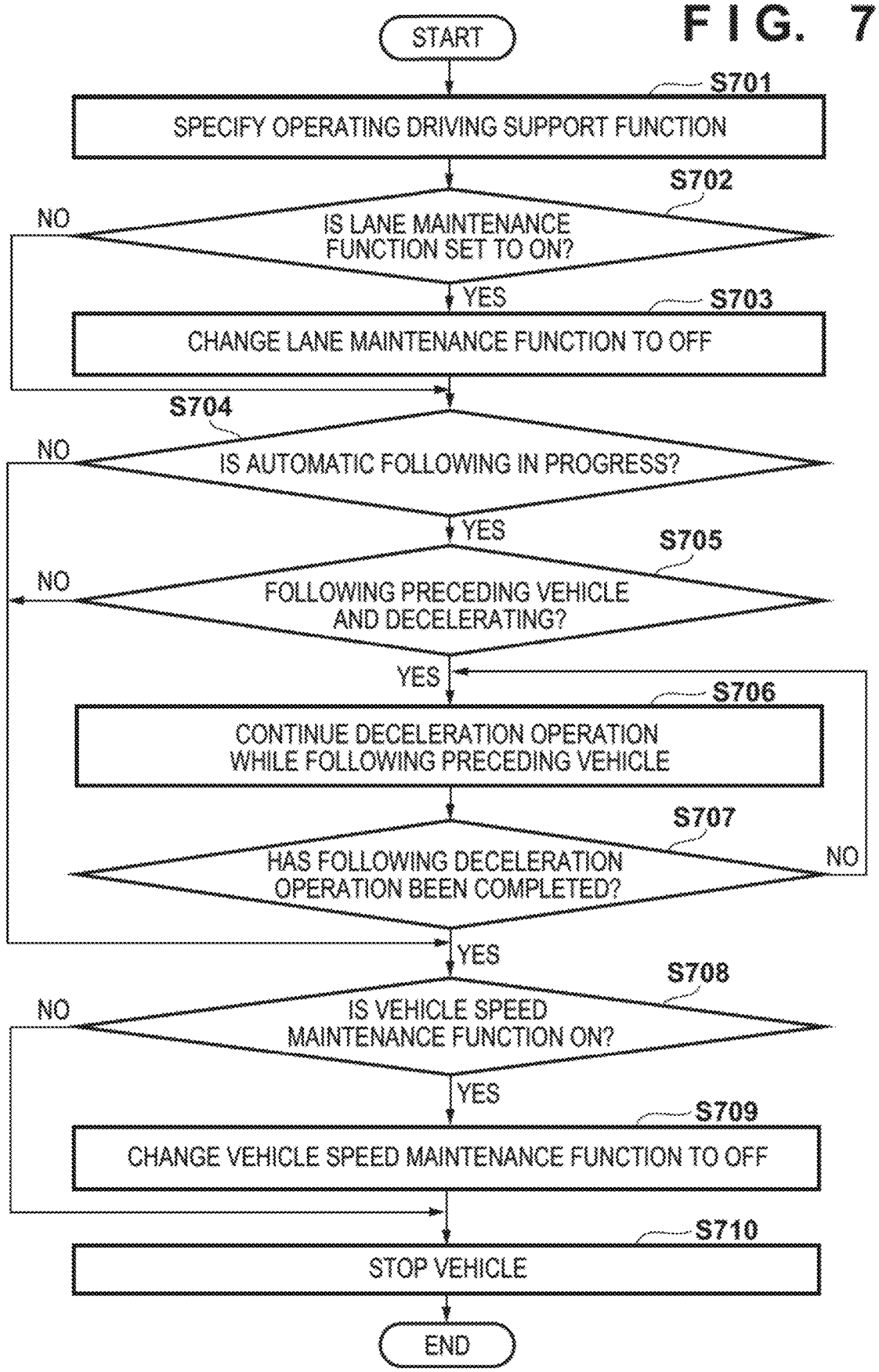

CONTROL SYSTEM OF VEHICLE, CONTROL METHOD OF THE SAME, AND NON-TRANSITORY COMPUTER-READABLE STORAGE MEDIUM

CROSS-REFERENCE TO RELATED APPLICATION(S)

This application claims priority to and the benefit of Japanese Patent Application No. 2019-001354 filed on Jan. 8, 2019, the entire disclosure of which is incorporated herein by reference.

BACKGROUND OF THE INVENTION

Field of the Invention

The present invention relates to a control system of a vehicle, a control method of the same, and a non-transitory computer-readable storage medium.

Description of the Related Art

In vehicle driving support control, there is known control performed at the time of an emergency such as in a case in which it becomes difficult for a driver to drive the vehicle and the like. For example, Japanese Patent Laid-Open No. 2000-276690 discloses a method in which an automated driving mode is continued to guide a vehicle to an emergency lane in a case in which steering override by the driver is not detected when the vehicle is required to switch from the automated driving travel mode to a manual driving travel mode.

Since an operation by the driver will be restricted in the driving support control executed at the time of an emergency, the risks that may occur need to be minimized. For example, in case in which the driver cannot perform an operation even if a switch to the operation by the driver is required when traveling on a road with a plurality of lanes, a lane change operation, an operation to stop the vehicle, or the like will need to be performed depending on the status of the periphery.

SUMMARY OF THE INVENTION

Hence, the present invention provides more safely control a vehicle in accordance with the peripheral environment, in a case in which driving change is not performed when the driving of the vehicle needs to be changed to the driver.

An embodiment according to the present invention, there is provided a control system of a vehicle that can travel in a first travel state in which an operation by a driver is not required and in a second travel state in which the operation by the driver is required, comprising: a first determination unit configured to determine whether a shift from the first travel state to the second travel state is required; a requesting unit configured to make an operation request to the driver when the first determination unit determines that the shift is required; a second determination unit configured to determine whether the driver has performed an operation in response to the request from the requesting unit; and a control unit configured to stop the vehicle in a predetermined position when the second determination unit determines that the driver has not performed the operation, wherein in a case in which a lane change operation is required to stop the vehicle in the predetermined position, the control unit reduces a speed of travel of the self-vehicle in accordance with each of a vehicle speed set for a first lane before the lane change operation and a vehicle speed set for a second lane after the lane change operation.

Another embodiment according to the present invention, there is provided a control method of a vehicle that can travel in a first travel state in which an operation by a driver is not required and in a second travel state in which the operation by the driver is required, the method comprising: determining whether a shift from the first travel state to the second travel state is required; requesting the driver to perform an operation when it is determined that the shift is required in the determining whether the shift from the first travel state to the second travel state is required; determining whether the driver has performed an operation in response to the request in the requesting; and stopping the vehicle in a predetermined position when it is determined that the driver has not performed the operation in the determining whether the driver has performed the operation in response to the request in the requesting, wherein in the stopping, in a case in which a lane change operation is required to stop the vehicle in the predetermined position, a speed of travel of the self-vehicle is reduced in accordance with each of a vehicle speed set for a first lane before the lane change operation and a vehicle speed set for a second lane after the lane change operation.

Yet another embodiment according to the present invention, there is provided a non-transitory computer-readable storage medium storing a program to cause a computer, which is incorporated in a vehicle that can travel in a first travel state in which an operation by a driver is not required and in a second travel state in which the operation by the driver is required, to function as a first determination unit configured to determine whether a shift from the first travel state to the second travel state is required; a requesting unit configured to make an operation request to the driver when the first determination unit determines that the shift is required; a second determination unit configured to determine whether the driver has performed an operation in response to the request from the requesting unit; and a control unit configured to stop the vehicle in a predetermined position when the second determination unit determines that the driver has not performed the operation, wherein in a case in which a lane change operation is required to stop the vehicle in the predetermined position, the control unit reduces a speed of travel of the self-vehicle in accordance with each of a vehicle speed set for a first lane before the lane change operation and a vehicle speed set for a second lane after the lane change operation.

According to the present invention, in a case in which driving change is not performed when the driving of the vehicle needs to be changed to the driver, a vehicle can be more safely controlled in accordance with the peripheral environment.

Further features of the present invention will become apparent from the following description of exemplary embodiments (with reference to the attached drawings).

BRIEF DESCRIPTION OF THE DRAWINGS

FIG. 2 is a view for explaining the outline of vehicle control according to the embodiment of the present invention;

FIGS. 3A to 3C are views for explaining the outline of control performed at the time of a lane change operation according to the embodiment of the present invention;

FIG. 7 is a flowchart of stop-guidance processing according to the second embodiment.

DESCRIPTION OF THE EMBODIMENTS

Figure 1:
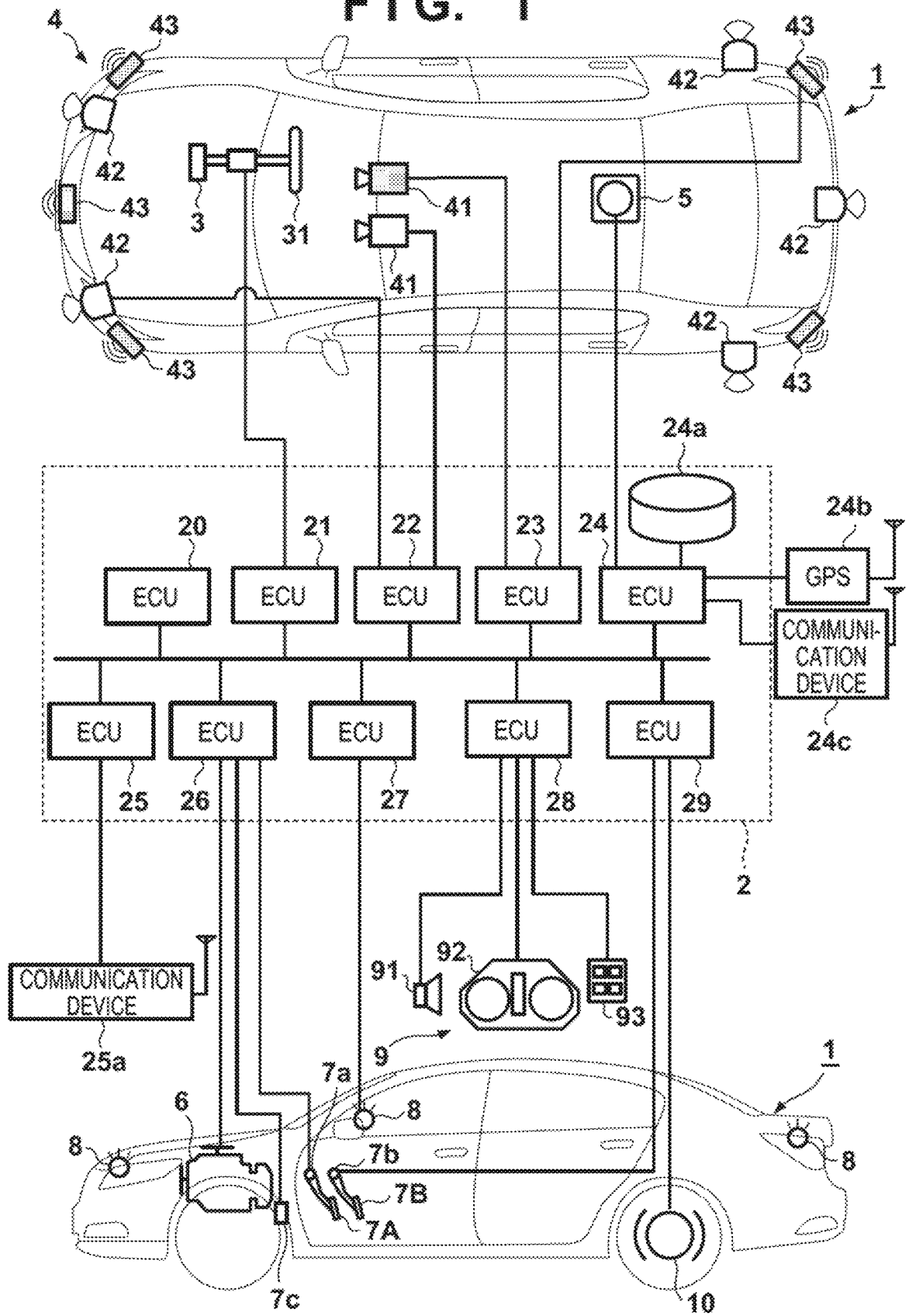
FIG. 1 is a block diagram of a vehicle control apparatus according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

[Vehicle Arrangement]

FIG. 1 is a block diagram of a vehicle control apparatus according to an embodiment of the present invention and controls a vehicle 1. FIG. 1 shows the outline of the vehicle 1 by a plan view and a side view. The vehicle 1 is, for example, a sedan-type four-wheeled vehicle.

The control apparatus shown in FIG. 1 includes a control system 2. The control system 2 includes a plurality of ECUs 20 to 29 communicably connected by an in-vehicle network. Each ECU (Electronic Control Unit) functions as a computer which includes a processor represented by a CPU (Central Processing Unit), a storage device such as a semiconductor memory, an interface with an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can be appropriately designed in the vehicle 1, and they can be subdivided or integrated as compared to this embodiment.

The ECU 20 executes control associated with automated driving of the vehicle 1. In automated driving, at least one of steering and acceleration/deceleration of the vehicle 1 is automatically controlled. In a control example to be described later, both steering and acceleration/deceleration are automatically controlled.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1.

The ECUs 22 and 23 perform control of detection units 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the roof front of the vehicle 1. When images captured by the cameras 41 are analyzed, the contour of a target or a division line (a white line or the like) of a lane on a road can be extracted.

The detection unit 42 is Light Detection and Ranging (LIDAR) (to be sometimes referred to as the LIDAR 42 hereinafter), and detects a target around the vehicle 1 or measures the distance to a target. In this embodiment, five LIDARs 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each LIDAR 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras, LIDARs, and radars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information and traffic information and acquires these pieces of information. The ECU 24 can access a map information database 24a formed in the storage device. The ECU 24 searches for a route from the current position to the destination.

The ECU 25 includes a communication device 25a for inter-vehicle communication. The communication device 25a performs wireless communication with another vehicle on the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice. A display device 92 notifies the driver of information by displaying an image. The display device 92 is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation, is used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission of the power plant 6 includes a parking lock mechanism, it can be operated to maintain the stop state of the vehicle 1.

[Examples of Control Functions]

The control function of the vehicle 1 includes traveling-associated functions associated with control of driving, braking, and steering of the vehicle 1, and notification functions associated with a notification of information to the driver.

Examples of traveling-associated functions are lane maintenance control, lane departure suppression control (road departure suppression control), lane change control, preceding vehicle following control, collision reduction brake control, and erroneous start suppression control. Examples of the notification functions are adjacent vehicle notification control and preceding vehicle start notification control.

Lane maintenance control is one of control processes for the position of the vehicle with respect to a lane. This control makes the vehicle travel automatically (without depending on the driving operation of the driver) on the track of travel set in a lane. Lane departure suppression control is one of control processes for the position of the vehicle with respect to a lane. A white line or a median strip is detected, and steering is automatically performed so the vehicle does not pass across the line. As described above, lane departure suppression control and lane maintenance control are different functions.

Lane change control is control performed to automatically move the vehicle from the lane on which the vehicle is traveling to an adjacent lane. Preceding vehicle following control is control of automatically following another vehicle traveling ahead of the self-vehicle. Collision reduction brake control is control that supports collision avoidance by automatically braking the vehicle when the possibility of collision against an obstacle ahead of the vehicle rises. Erroneous start suppression control is control to limit acceleration of the vehicle in a vehicle stop state in a case in which the acceleration operation by the driver is a predetermined amount or more, and suppresses an abrupt start.

Adjacent vehicle notification control is control of notifying the driver of the presence of another vehicle traveling on the adjacent lane which is adjacent to the travel lane of the self-vehicle. The driver is notified of, for example, the presence of another vehicle traveling on a side or on a rear side of the self-vehicle. Preceding vehicle start notification control is control performed to notify the driver that another vehicle ahead has started when the self-vehicle and another vehicle ahead are in a stop state. These notifications can be made by the in-vehicle notification devices described above.

[Outline of Operation]

The outline of vehicle support control according to this embodiment will be described with reference to FIG. 2. The position of the vehicle on a road is indicated on the upper portion of FIG. 2. An example in which the vehicle is traveling on a right lane of a one-way two-lane road is shown here. In this case, driving support control is performed in the vehicle. For the sake of descriptive convenience, this state will be referred to as "automated driving" in the following description, and be assumed to be a state in which a manipulation or an operation by the driver is not required (or not requested) in a normal operation of this automated driving. In contrast, assumed that a state in which the vehicle is operated by an operation by the driver will be referred to as "manual driving".

An example of the states of the vehicle and the control processes performed in the vehicle are shown in the middle portion of FIG. 2. The vehicle speed is shown in the lower portion of FIG. 2; the ordinate indicates the vehicle speed and the abscissa indicates the elapsed time. Assume that the timings shown in the upper portion, the middle portion, and the lower portion are in correspondence with each other in FIG. 2.

While automated driving is performed in the vehicle, some kind of an event occurs at the timing of t1, and a request (change request) to switch from automated driving to manual driving is made to the driver due to this event. The event in this case is an event which causes the vehicle to determine that the continuation of automated driving will be difficult such as, for example, when the vehicle is approaching the end of a region that can be traveled by automated driving or the like. A driving change request may be performed visually by flashing of a light source such as a light or by voice.

Assume that the timing of t2 has arrived without a driving change operation by the driver. Assume that the length of the period from t1 to t2 has been predefined. Note that the length of the period from t1 to t2 may change in accordance with the event that has occurred as an event which requires a driving change request. Automated driving is continued during the period from t1 to t2, and the lane maintenance operation and the like will be maintained in the lane on which the vehicle is currently traveling in this period. Also, the driving change request notification to the driver will be continued. At the timing of t2, the vehicle determines that the driving operation cannot be switched to the driving operation by the driver. The vehicle starts, in accordance with this determination, an operation (to be referred to as vehicle stop-guidance control) to guide the self-vehicle to a safe state.

When it is detected that the driving operation cannot be switched to the driver, the vehicle will start to perform an operation to make an external notification of the emergency. Examples of the external notification operations are flashing of hazard lights, honking of a car horn, and the like. Also, the vehicle can start performing control to decelerate the travel speed of the self-vehicle in accordance with the state of its periphery. In addition, the position at which the vehicle is to be stopped is searched for and decided by using information based on detection results from the respective detection units, a high-precision map, and the like. Since the case exemplified in FIG. 2 shows a state in which the vehicle is traveling on the rightmost lane, it will be described that the vehicle will make a lane change and be stopped at the shoulder of the road on the left end.

In the case exemplified in FIG. 2, a vehicle stop operation is performed after a lane change operation has been performed twice during a period from t2 to t6. Although the speed of the vehicle is gradually reduced, the deceleration amount (change amount) can be changed in accordance with the position on which the vehicle is traveling on the road. In the case exemplified in FIG. 2, the change amount at the time of deceleration is increased in accordance with the gradual movement of the vehicle to the outer lane. Note that although the case exemplified in FIG. 2 shows an example in which the speed of the vehicle is reduced constantly in accordance with the deceleration control, the present invention is not limited to this. For example, control can be performed so that a predetermined speed will be maintained, even in a period in which the deceleration control is being performed, in accordance with the presence/absence of another vehicle in the periphery or the like.

After the vehicle is stopped at the timing of t5, the vehicle is made to maintain this stopped state. At this time, the driving change request to the driver and the external notification control are continued. Furthermore, an additional external notification operation may be performed in a state in which the vehicle has been stopped. For example, emergency notification/contact to a predetermined contact address may be performed by using one of the communication devices included in the vehicle. It may be arranged so that this notification operation will be started after a predetermined time has elapsed since the vehicle was stopped at the timing of t5.

Subsequently, when it has been detected that the driver has accepted the driving change, the vehicle will switch the control state to manual driving and restart the travel at timing t6. A case in which the driving change will be detected corresponds to a case in which the driver makes an operation to accept the driving change by operating the steering wheel, pressing a predetermined button, or the like.

[Control at Time of Lane Change]

FIGS. 3A to 3C are views for explaining a lateral operation performed at the time of a lane change operation according to this embodiment. An example in which the lane change operation is performed twice while the vehicle travels on a one-way two-lane road will be described with reference to the example of FIG. 2 here. For the sake of descriptive convenience, a lane change operation performed between timings t2 and t3 shown in FIG. 2 will be described as a lane change operation A, and a lane change operation performed between timings t4 and t5 will be described as a lane change operation B.

FIG. 3A is a view showing an example of a normal lane change operation performed at the time of automated driving. A distance traveled by the vehicle from the start to the end of the lane change operation will be indicated as D1.

FIG. 3B is a view showing an example of a lane change operation executed as the lane change operation A according to this embodiment. A distance traveled by the vehicle from the start to the end of the lane change operation will be indicated as D2. In the lane change operation A, a lane change operation has been performed from the right lane to the left lane of the two lanes.

FIG. 3C is a view showing an example of a lane change operation executed as the lane change operation B according to this embodiment. A distance traveled by the vehicle from the start to the end of the lane change operation will be indicated as D3. Assume that the end of the lane change operation B here is the same as the stop position or is on a line in the direction of travel of the stop position.

In FIGS. 3A to 3C, D1<D2<D3. Note that although the distance has been raised as an example here, a similar relationship can be obtained in the case of the time required to make the lane change operations.

To perform control as shown in FIGS. 3A to 3C, the deceleration amount of the speed of travel is controlled in accordance with the lane on which the self-vehicle is traveling when the lane change operation is to be performed at the time of an emergency. The deceleration amount (the change amount in the vertical direction) of the speed of travel is controlled based on (the lower limit or the upper limit of) a predetermined speed set to a lane before the lane change operation and (the lower limit or the upper limit of) a predetermined speed set to a lane after the lane change operation, the relative speed with respect to each vehicle traveling in the periphery of the self-vehicle, the positional relationship with the position at which the self-vehicle is to be stopped, and the like.

[Processing Procedure]

Figure 4:
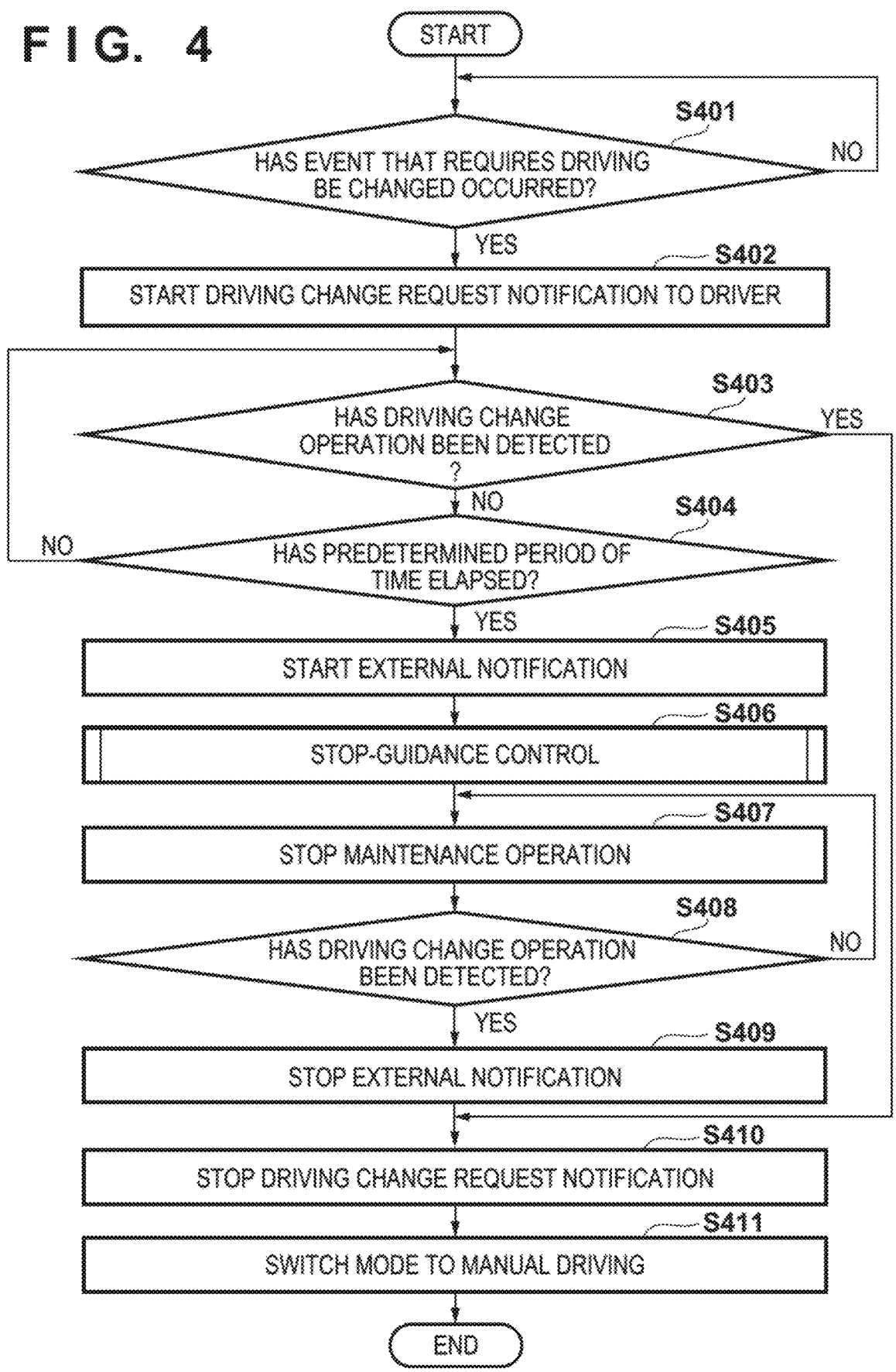
FIG. 4 is a flowchart of vehicle control processing according to the embodiment of the present invention.

The processing procedure of control processing according to this embodiment will be described with reference to FIG. 4. Although the various kinds of ECUs and the like included in the vehicle as described above will cooperate to perform processing in each control process of this processing procedure, the main entity of processing will be indicated as the control system 2 of the vehicle 1 for the sake of descriptive convenience here. Assume that this processing will be started and performed when automated driving control is performed in the vehicle 1.

In step S401, the control system 2 determines whether an event that requires the driving to be changed to the driver has occurred when automated driving control is being performed. An event that requires a driving change is, for example, an event in which it is determined that the continuation of automated driving is difficult due to, for example, the state of vehicles in the periphery detected by the detection units, the state of the road, and the like. If it is determined that an event requiring a driving change has not occurred (NO in step S401), the control system 2 continues the automated driving operation, and the process returns to step S401. If it is determined that an event requiring a driving change has occurred (YES in step S401), the process advances to step S402.

In step S402, the control system 2 starts the notification to make a driving change request to the driver. The notification here may be, for example, performed visually by light or performed aurally by voice.

In step S403, the control system 2 determines whether a driving change operation by the driver has been detected. In this case, the driving change operation is, for example, an operation of the steering wheel or an operation made on predetermined operation portion such as a button, a lever, or the like. If the driving change operation is detected (YES in step S403), the process advances to step S410. Otherwise (NO in step S403), the process advances to step S404.

In step S404, the control system 2 determines whether predetermined time has elapsed since the start of the notification in step S402. The predetermined time here may change in accordance with the event detected in step S401 or may increase/decrease in accordance with the change in the peripheral environment. For example, if the predetermined time has been initially set to five seconds in correspondence with the generated event, the predetermined time may be changed to two seconds when a new peripheral vehicle is detected. If it is determined that the predetermined time has not elapsed (NO in step S404), the process advances to step S403. If it is determined that the predetermined time has elapsed (YES in step S404), the process advances to step S405.

In step S405, the control system 2 starts external notification upon determining that some kind of emergency has occurred. The external notification performed in this case may be, for example, an operation such as flashing of the hazard lights, honking the car horn in accordance with a predetermined pattern, or the like.

In step S406, the control system 2 performs stop-guidance control. The process of this step will be described later with reference to FIG. 5. This control operation causes the vehicle 1 to stop in a decided position.

In step S407, the control system 2 performs stop-maintenance operation of the vehicle 1. For example, the control system can light up the hazard lights, switch the gear, maintain the brake state, and the like. Also, the control system 2 may perform additional external notification in this state. More specifically, the control system can use the communication units included in the vehicle 1 to make an emergency notification/contact to a predetermined contact address. Note that although this embodiment showed an arrangement in which notification/contact is made to a predetermined contact address while the stop-maintenance operation is performed, the present invention is not limited to this. For example, it may be arranged so that notification to the predetermined contact address will be performed together with the decision of the stop position in the stop-guidance control (to be described later in FIG. 5) in step S406 to notify the predetermined contact address of the determined stop position.

In step S408, the control system 2 determines whether the driving change operation by the driver has been detected. The driving change operation in this case is, for example, for example, an operation of the steering wheel or an operation made on predetermined operation portion such as a button, a lever, or the like. If the driving change operation is detected (YES in step S408), the process advances to step S409. Otherwise (NO in step S408), the process returns to step S407.

In step S409, the control system 2 stops the external notification operation started in step S405. Subsequently, the process advances to step S410.

In step S410, the control system 2 stops the driving change request notification to the driver which was started in step S402. Subsequently, the process advances to step S411.

In step S411, the control system 2 switches the driving mode to the manual driving mode. Subsequently, the processing procedure ends. Vehicle travel and the like will be performed based on the operation (manual driving) by the driver from this step and onward.

(Stop-Guidance Control)

Figure 5:
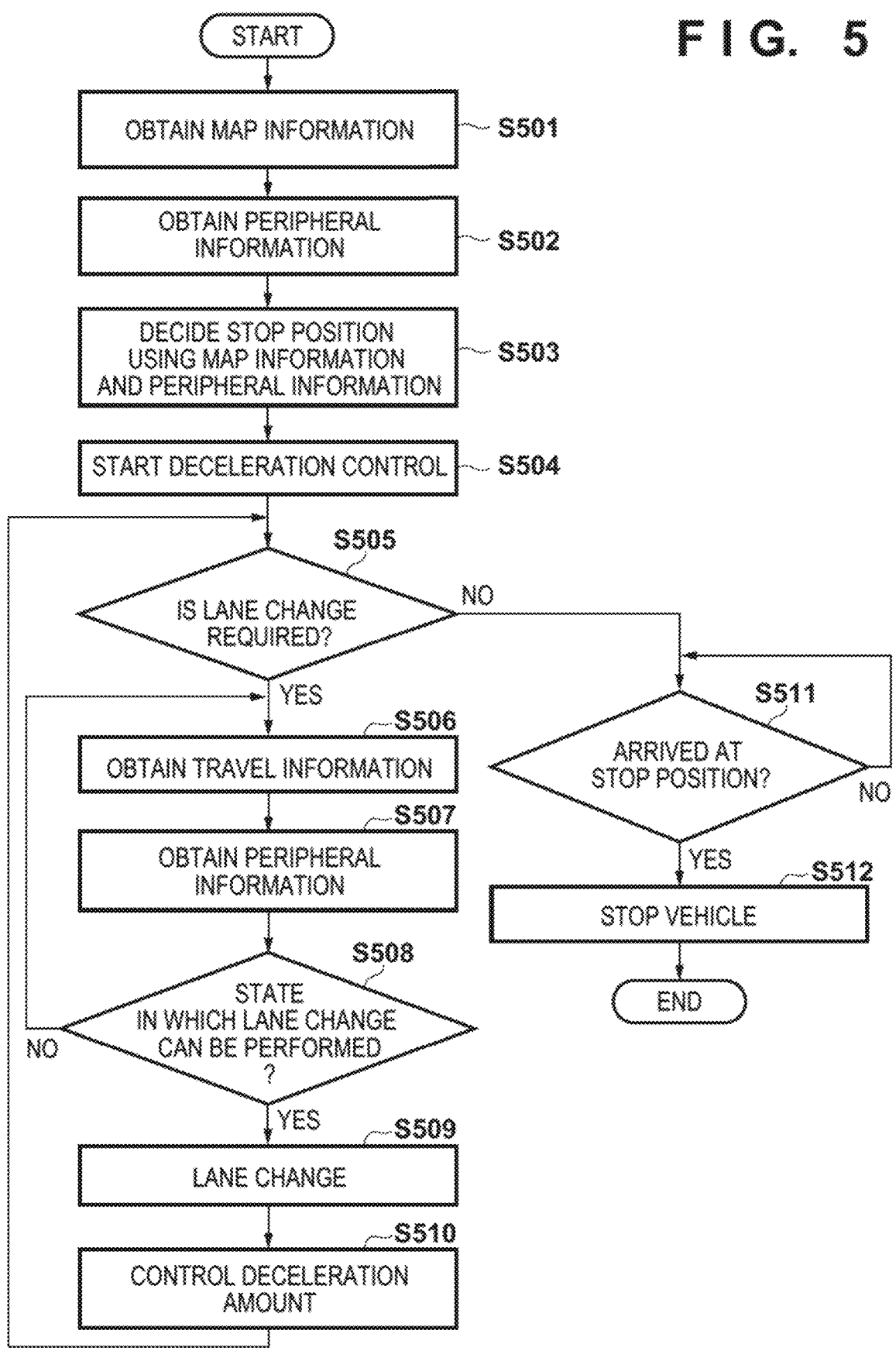
FIG. 5 is a flowchart of stop-guidance processing according to the embodiment of the present invention.

FIG. 5 shows a flowchart of stop-guidance control processing according to this embodiment. This processing corresponds to the process of step S406 in FIG. 4.

In step S501, the control system 2 obtains map information. Map information may be held in advance by the vehicle 1 or may be obtained together with the latest road information by communicating with an external apparatus.

In step S502, the control system 2 obtains peripheral information of the self-vehicle. The peripheral information in this case corresponds to, for example, information of the positions of other vehicles in the periphery, the state of the road, and the like. The peripheral information can be obtained from the detection units (sensors, cameras, and the like) included in the vehicle 1 or can be obtained by communicating with another vehicle or an external apparatus.

In step S503, the control system 2 uses the map information obtained in step S501 and the peripheral information obtained in step S502 to decide the stop position of the vehicle 1. The decision method of the stop position used here will be described later. Note that both the map information and the peripheral information need not always be used when the stop position is to be decided, and the determination may be made by using only one of these pieces of information.

In step S504, the control system 2 starts the travel speed deceleration control of the vehicle 1. The deceleration amount (change amount) at the start of the deceleration control in this case can be decided from the travel position (lane) on the road, the presence/absence of a lane change operation, the distance to the stop position, the speed of travel at that time, the presence/absence of peripheral vehicles, and the like. More specifically, in a case in which the vehicle is traveling at a speed equal to or more than the vehicle speed set for the lane on which the self-vehicle is traveling, it may be a control process that will reduce the speed of travel of the self-vehicle to the set vehicle speed.

In step S505, the control system 2 determines whether a lane change from the current lane of travel is required to arrive at the stop position. If it is determined that the lane change is required (YES in step S505), the process advances to step S506. Otherwise (NO in step S505), the process advances to step S511.

In step S506, the control system 2 obtains the travel information of the self-vehicle. The travel information here corresponds to, for example, the speed of travel of the self-vehicle, the travel position on the road, and the like. The travel information can be obtained from the control units and the like of the self-vehicle.

In step S507, the control system 2 obtains the peripheral information of the self-vehicle. The peripheral information here corresponds to, for example, the information of the positions of other vehicles in the periphery, the state of the road, and the like. The peripheral information can be obtained from the detection units (sensors, cameras, and the like) included in the vehicle 1 or can be obtained by communicating with another vehicle or an external apparatus.

In step S508, the control system 2 determines whether a lane change operation can be performed based on the obtained peripheral information and the travel information. The determination method here can be based on, for example, the presence/absence of other vehicles, the shape of the road, and the like, and is not particularly limited. If it is determined that the lane change operation can be performed (YES in step S508), the process advances to step S509. If it is determined that the lane change operation cannot be performed (NO in step S508), the vehicle will continue to travel on the current lane, and the process returns to step S506.

In step S509, the control system 2 performs the lane change operation. In this embodiment, as described with reference to FIGS. 3A to 3C, the lane change operation is performed at a speed of movement in the lateral direction which is different from that used when a normal automated-driving operation (FIG. 3A) is performed. As shown in FIGS. 3A to 3C, the speed of movement in the lateral direction in this case is suppressed more than that in the case of the normal automated-driving operation, and is decided based on the shapes of the lane on which the self-vehicle is currently traveling and the adjacent lane, the overall arrangement of the road, the distance to the stop position, and the like. Note that if lighting of the hazard lights has been performed as an external notification operation, it may be switched to lighting of the turn signal in the lane change direction only while the lane change operation is being performed.

In step S510, after the lane change operation of step S509 has ended, the control system 2 controls the deceleration amount (change amount) of the current speed of travel. The deceleration amount here is decided based on (the lower limit or the upper limit of) a predetermined speed of travel set to the lane after the lane change operation, the relative speed with respect to each vehicle traveling in the periphery of the self-vehicle, the positional relationship with the position at which the self-vehicle is to be stopped, and the like. For example, in the case of the example shown in FIG. 2, the deceleration amount is increased as the self-vehicle becomes closer to the outer lane. Subsequently, the process returns to step S505.

In step S511, the control system 2 determines whether the self-vehicle has arrived at the stop position decided in step S503. If the self-vehicle has arrived at the stop position (YES in step S511), the process advances to step S512. Otherwise (NO in step S511), the travel of the self-vehicle is continued.

In step S512, the control system 2 stops the vehicle. Subsequently, the processing procedure ends, and the process advances to step S407 of FIG. 4.

(Stop Position)

A method used to decide the stop position of the vehicle 1 according to this embodiment will be described with reference to FIGS. 6A to 6C. As described above, the vehicle 1 according to this embodiment can use the road information and can obtain information related to the shape of the road and the like.

In this embodiment, the stop position is decided by setting a position where possibility of travel by another vehicle is low as the stop position. More specifically, if a plurality of lanes are present, the shoulder at the outermost side of the road, a position where no other vehicle is stopped, or the like can be set as the stop position. In this embodiment, for example, the map information and the peripheral information of the self-vehicle can be used when the stop position is to be decided. In a case in which few vehicles are present in the periphery or in a case of a straight road with a good visibility, the stop position may be decided on the passing lane or the like.

Figure 6A:
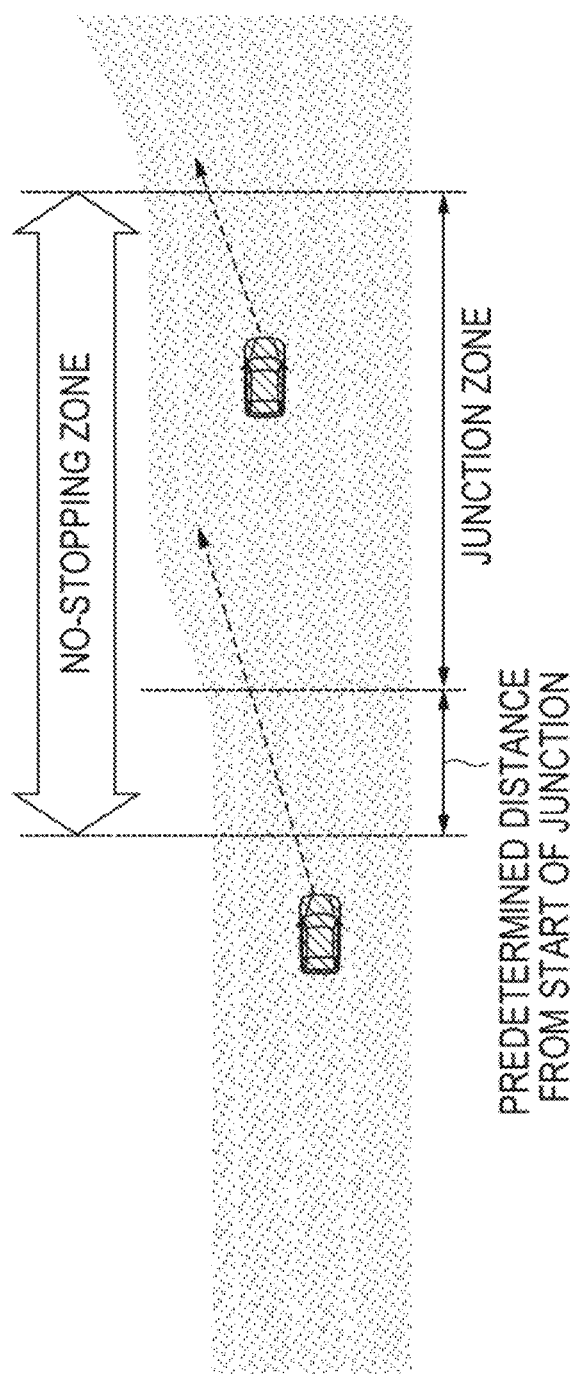
FIGS. 6A to 6C are views for explaining a no-stopping zone according to the embodiment of the present invention.
Figure 6B:
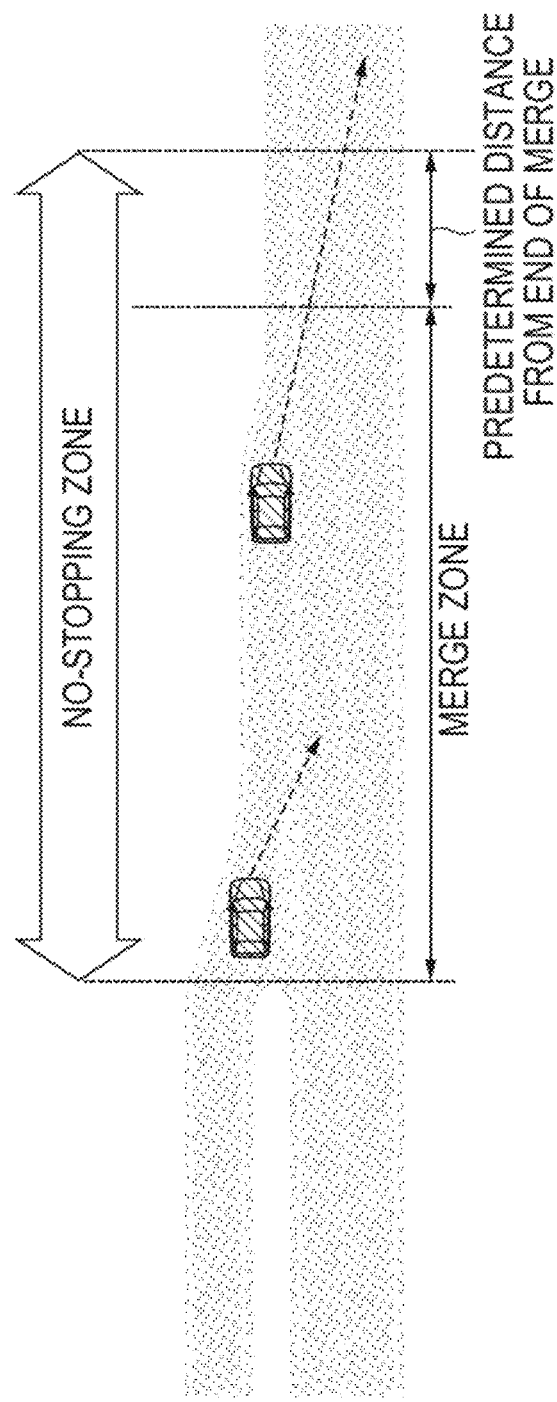
Figure 6C:
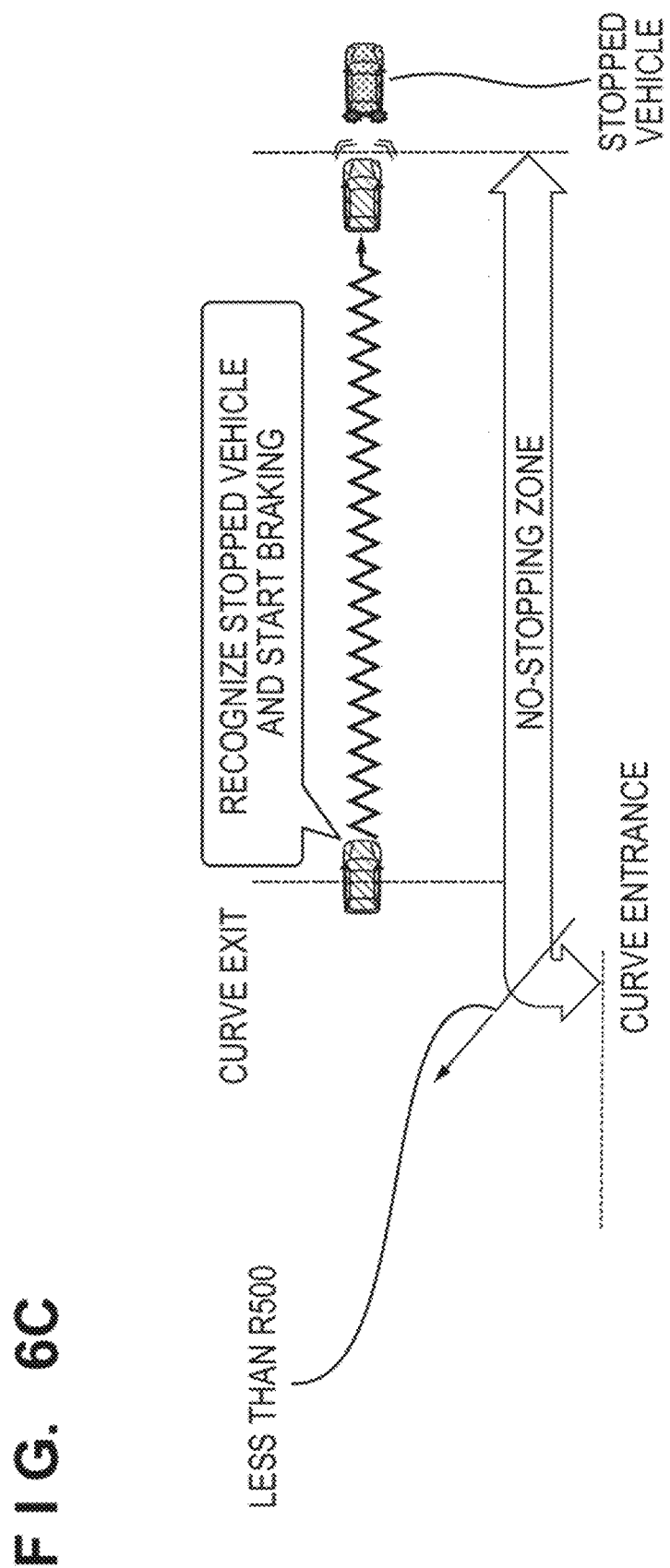

FIGS. 6A to 6C show an example of a no-stopping zone according to this embodiment. That is, in this embodiment, the no-stopping zone will not be decided as the stop position, and the vehicle 1 will be guided not to stop in the no-stopping zone.

FIG. 6A shows the periphery of a junction point of a road, such as an expressway or the like, formed by a plurality of lanes. Each broken line arrow indicates the track of the lane change operation of each vehicle heading toward the junction. In this case, assume that the no-stopping zone is formed by the junction zone and a zone which is set up to a predetermine distance from the start of the junction zone. Note that if a channelization zone is present in the periphery of these zones, this region will also be set as the no-stopping zone. The zone which is set up to a predetermined distance from the start of the junction is a zone that can impede the lane change operation of a vehicle heading toward the junction. This predetermined distance can be decided in accordance with the shape of the road and the like. The junction zone is a zone that can impede the lane changing operation of a vehicle that is to travel the junction.

FIG. 6B shows the periphery of a merge point of a road, such as an expressway or the like, formed by a plurality of lanes. Each broken line arrow indicates the track of the lane change operation of a merging vehicle. In this case, assume that the no-stopping zone is formed by a merge zone and a zone which is set up to a predetermined distance from the merge zone. Note that if a channelization zone is present in the periphery of these zones, this region will also be set as the no-stopping zone. A merge zone is a zone that can impede the lane change operation of a merging vehicle. The predetermined distance from the end of the merge is a zone that can impede the lane change operation of the vehicle that has merged. This predetermined distance will be decided in accordance with the shape of the road and the line.

FIG. 6C shows the periphery of a curve which has a predetermined radius R of curvature. In this case, the no-stopping zone is formed by a zone from the entrance to the exit of the curve and a zone which is set up to a predetermined distance from the exit of the curve. Here, assume that the predetermined distance is a distance longer than a distance at which a vehicle can stop from the exit of the curve by braking at a predetermined strength from a set speed of the curve in a case in which, for example, the radius R of curvature of the curve is less than 500 m. Defining the predetermined distance in this manner will allow the driver of a succeeding vehicle to avoid a preceding vehicle in a case in which the succeeding vehicle finds that the preceding vehicle has stopped traveling immediately after the succeeding vehicle has driven around a curve. Note that if it seems possible for the succeeding vehicle to make a lane change operation even in a case in which the vehicle has stopped after driving around a curve, such as in a case in which the radius R of curvature of the curve is equal to or greater than 500 m, the predetermined distance may be set to be short.

By setting zones as those shown in FIGS. 6A and 6B to be no-stopping zones, it is possible to prevent the obstruction of the traffic of other vehicles and the occurrence of a secondary disaster that may be caused by stopping a vehicle in the vicinity of a merge point or a junction point. In a similar manner, by setting a zone such as that shown in FIG. 6C to be a no-stopping zone, it is possible to prevent the obstruction of the traffic of other vehicles and the occurrence of a secondary disaster that may be caused by stopping a vehicle near a curve.

As described above, according to this embodiment, in a case in which driving change is not performed when the driving of the vehicle needs to be changed to the driver, a vehicle can be more safely controlled in accordance with the peripheral environment.

Note that in the arrangement described above, when it is determined that a lane change operation is required in step S505 of FIG. 5, the timing of the lane change operation is decided based on the peripheral information. However, the present invention is not limited to this arrangement. For example, even after it has been determined that a lane change operation is required, in a case in which it is impossible (or difficult) to perform the lane change operation based on the peripheral information, the vehicle stop position can be decided again so the self-vehicle can stop without making a lane change operation. As a result, for example, in a case in which the vehicle cannot stop, due to changes in the peripheral environment, within a predetermined time at a stop position (such as the shoulder of the road or the like) that requires a lane change operation at the time of an emergency, it becomes possible to perform control so that the self-vehicle will safely stop in the lane on which it is traveling. In this case, if a notification of the stop position has already been sent to a predetermined contact address, a notification of the updated stop position can be performed again.

Second Embodiment

Another mode in which stopping control is performed in accordance with an automated driving mode used before the occurrence of a driving change request to a driver will be described as the second embodiment of the present invention. Note that a description of arrangements that overlap those of the first embodiment will be omitted, and only the differences will be described.

[Processing Procedure]

FIG. 7 shows a flowchart of control processing according to this embodiment. Although the various kinds of ECUs and the like included in the vehicle as described above will cooperate to perform processing in each control process of this processing procedure, the main entity of processing will be indicated as a control system 2 of a vehicle 1 for the sake of descriptive convenience here. This processing corresponds to the stop-guidance processing of step S406 in FIG. 4 described in the first embodiment.

In step S701, the control system 2 specifies driving support functions that are currently operating in the self-vehicle. In this case, a lane maintenance function, an automatic preceding vehicle following function, and a vehicle speed maintenance function of the aforementioned control functions will be exemplified as the driving support functions.

In step S702, the control system 2 determines whether the lane maintenance function is set to ON. If it is determined that the lane maintenance function is set to ON (YES in step S702), the process advances to step S703. If it is determined that the lane maintenance function is set to OFF (NO in step S702), the process advances to step S704.

In step S703, the control system 2 changes the lane maintenance function to OFF. Subsequently, the process advances to step S704.

In step S704, the control system 2 determines whether the self-vehicle is performing automatic following of the preceding vehicle which is traveling ahead of the self-vehicle. If it is determined that the automatic preceding vehicle follow operation is performed (YES in step S704), the process advances to step S705. If it is determined that the automatic preceding vehicle follow operation is not performed (NO in step S704), the process advances to step S708.

In step S705, the control system 2 determines whether the self-vehicle is performing a deceleration operation in accordance with the deceleration operation of the preceding vehicle while the automatic follow operation is executed. If it is determined that the deceleration operation is performed (YES in step S705), the process advances to step S706. If it is determined that the deceleration operation is not performed (NO in step S705), the process advances to step S708.

In step S706, the control system 2 continues the deceleration operation while following the preceding vehicle. Subsequently, the process advances to step S707.

In step S707, the control system 2 determines whether the deceleration operation while following the preceding vehicle has been completed. In this case, it will be determined that the deceleration operation while following the preceding vehicle has been completed when the speed of travel of the preceding vehicle has increased or has become constant. If it is determined that the deceleration operation while following the preceding vehicle has been completed (YES in step S707), the process advances to step S708. If it is determined that the deceleration operation while following the preceding vehicle has not been completed (NO in step S707), the process returns to step S706.

In step S708, the control system 2 determines whether the vehicle speed maintenance function is ON. If it is determined that the vehicle speed maintenance function is ON (YES in step S708), the process advances to step S709. If it is determined that the vehicle speed maintenance function is OFF (NO in step S708), the process advances to step S710.

In step S709, the control system 2 changes the vehicle speed maintenance function to OFF. Subsequently, the process advances to step S710.

In step S710, the control system 2 stops the vehicle. Subsequently, the processing procedure ends, and the process advances to step S407 of FIG. 4. Note that in this embodiment, the vehicle will stop in the lane on which the vehicle is traveling.

For example, in a case in which the map information is absent or in a case in which there are many traffic participants (vehicles and pedestrians) on the road, the lane change operation and the decision of the stop position entail risks. Hence, this embodiment has described a mode in which the vehicle is safely stopped without performing a lane change operation. In addition, disabling the driving support functions after appropriately performing a deceleration operation when automatic preceding vehicle following control is performed will allow the self-vehicle to avoid a collision with another vehicle traveling ahead of or behind the self-vehicle.

OTHER EMBODIMENTS

The above embodiments described a case in which the vehicle is stopped at a predetermined stop position and a case in which the vehicle is stopped after the various kinds of driving support functions have been turned off. Other stop-maintenance methods will be described here. For example, assume a case in which the vehicle is stopped by performing emergency braking in accordance with the peripheral status while the stop-guidance control is being executed in the first embodiment or the second embodiment. In this case, control may be performed so that the stop-maintenance operation will be performed at that point.

Furthermore, even in a case in which an automatic preceding vehicle follow operation is being performed, if the speed of travel is equal to or less than a constant value due to the peripheral status such as a traffic jam or the like, the stop-maintenance control can be performed at that point and a notification related to the emergency can be performed immediately. In this case, it may be set so that the automatic preceding vehicle follow operation will be stopped or an operation such as a lane change operation will not be performed.

<Summary of Embodiments>

1. A vehicle control system according to the above-described embodiment is a control system (for example, 2) of a vehicle (for example, 1) that can travel in a first travel state in which an operation by a driver is not required and in a second travel state in which the operation by the driver is required, comprising:

first determination means (for example, 2) for determining whether a shift from the first travel state to the second travel state is required;

requesting means (for example, 2) for making an operation request to the driver when the first determination means determines that the shift is required;

second determination means (for example, 2) for determining whether the driver has performed an operation in response to the request from the requesting means; and control means (for example, 2) for stopping the vehicle in a predetermined position when the second determination means determines that the driver has not performed the operation, wherein in a case in which a lane change operation is required to stop the vehicle in the predetermined position, the control means reduces a speed of travel of the self-vehicle in accordance with each of a vehicle speed set for a first lane before the lane change operation and a vehicle speed set for a second lane after the lane change operation.

According to this embodiment, in a case in which driving change is not performed when the driving of the vehicle needs to be changed to the driver, a vehicle can be more safely controlled in accordance with the peripheral environment.

2. In the above-described embodiment, the control means decides a deceleration amount of the speed of travel of the self-vehicle based on one of an upper limit and a lower limit of a speed set for each lane.

According to this embodiment, at the time of an emergency, the deceleration amount of the speed of travel can be decided in correspondence with the lane on which the vehicle is traveling.

3. In the above-described embodiment, the control means decides a deceleration amount of the speed of travel of the self-vehicle based on a relative speed with respect to another vehicle positioned in the periphery of the self-vehicle.

According to this embodiment, at the time of an emergency, the deceleration amount of the speed of travel can be decided in correspondence with another vehicle positioned in the periphery.

4. In the above-described embodiment, the control system further comprises notification control means (for example, 2) for performing external notification when the second determination means determines that the driver has not performed the operation.

According to this embodiment, at the time of an emergency, it is possible to make a notification of the occurrence of an emergency to the outside of the vehicle.

5. In the above-described embodiment, the external notification is performed by one of a hazard light and a car horn.

According to this embodiment, at the time of an emergency, it is possible to make a notification of the occurrence of the emergency to the outside of the vehicle by using a part included in the vehicle.

6. In the above-described embodiment, the notification control means performs external notification by communication by a communication unit after the vehicle has stopped at the predetermined position.

According to this embodiment, it is possible to make a notification of an emergency occurring in the vehicle to a remote location at the time of the emergency.

7. In the above-described embodiment, the notification control means stops the external notification when it is detected that the driver has performed the operation after the vehicle has stopped at the predetermined position.

According to this embodiment, it is possible to suppress unnecessary external notification when the emergency has been resolved.

8. In the above-described embodiment, when the control means detects that the driver has performed the operation while the lane change operation is performed, the control means shifts the vehicle to the second travel state after the lane change operation has been completed.

According to this embodiment, it is possible to suppress a state in which the vehicle becomes unstable due to an operation performed by the driver when a lane change operation is being performed automatically.

9. In the above-described embodiment, the control means controls whether to start the lane change operation based on a peripheral environment.

According to this embodiment, it is possible to perform control so the lane change operation will be started safely or so the lane change operation will not be performed based on the peripheral environment even at the time of an emergency.

10. In the above-described embodiment, the control system further comprises decision means (for example, 2) for deciding the predetermined position based on an arrangement of a road on which the vehicle is traveling.

According to this embodiment, it is possible to decide a safe stop position at the time of an emergency.

11. In the above-described embodiment, the decision means decides the predetermined position in a lane on which the self-vehicle is traveling in accordance with a travel state of the self-vehicle and information of other vehicles positioned in the periphery of the self-vehicle.

According to this embodiment, a safe stop position at the time of an emergency can be decided in accordance with the peripheral environment and the travel state.

12. In the above-described embodiment, the predetermined position is a shoulder of a road.

According to this embodiment, it is possible to ensure safety by making an emergency stop at the shoulder of the road.

13. In the above-described embodiment, after the vehicle has been stopped at the predetermined position, the control means maintains a stopped state until an operation by a human is detected.

According to this embodiment, after the vehicle has been stopped at the time of an emergency, the stopped state can be maintained until an operation by a human is detected so that it will be possible to suppress the occurrence of an unintended movement of the vehicle due to a reason other than an operation by a human such as the driver, a rescuer, or the like.

14. A control method of a vehicle according to the above-described embodiment is a control method of a vehicle that can travel in a first travel state in which an operation by a driver is not required and in a second travel state in which the operation by the driver is required, the method comprising:

a first determination step of determining whether a shift from the first travel state to the second travel state is required;

a requesting step of requesting the driver to perform an operation when it is determined that the shift is required in the first determination step;

a second determination step of determining whether the driver has performed an operation in response to the request in the requesting step; and a control step of stopping the vehicle in a predetermined position when it is determined that the driver has not performed the operation in the second determination step, wherein in the control step, in a case in which a lane change operation is required to stop the vehicle in the predetermined position, a speed of travel of the self-vehicle is reduced in accordance with each of a vehicle speed set for a first lane before the lane change operation and a vehicle speed set for a second lane after the lane change operation.

According to this embodiment, in a case in which driving change is not performed when the driving of the vehicle needs to be changed to the driver, the vehicle can be more safely controlled in accordance with the peripheral environment.

15. A non-transitory computer-readable storage medium storing a program according to the above-described embodiment causes a computer, which is incorporated in a vehicle that can travel in a first travel state in which an operation by a driver is not required and in a second travel state in which the operation by the driver is required, to function as first determination for determining whether a shift from the first travel state to the second travel state is required;

requesting for making an operation request to the driver when the first determination means determines that the shift is required;

second determination for determining whether the driver has performed an operation in response to the request from the requesting means; and control for stopping the vehicle in a predetermined position when the second determination means determines that the driver has not performed the operation, wherein in a case in which a lane change operation is required to stop the vehicle in the predetermined position, the control means reduces a speed of travel of the self-vehicle in accordance with each of a vehicle speed set for a first lane before the lane change operation and a vehicle speed set for a second lane after the lane change operation.

According to this embodiment, in a case in which driving change is not performed when the driving of the vehicle needs to be changed to the driver, the vehicle can be more safely controlled in accordance with the peripheral environment.

The invention is not limited to the foregoing embodiments, and various variations/changes are possible within the spirit of the invention.

What is claimed is:

1. A control system of a vehicle that can travel in a first travel state in which an operation by a driver is not required and in a second travel state in which the operation by the driver is required, comprising:

a first determination unit configured to determine whether a shift from the first travel state to the second travel state is required;

a requesting unit configured to make an operation request to the driver when the first determination unit determines that the shift is required;

a second determination unit configured to determine whether the driver has performed an operation in response to the request from the requesting unit; and a control unit configured to stop the vehicle in a predetermined position when the second determination unit determines that the driver has not performed the operation, wherein in a case in which a lane change operation is required to stop the vehicle in the predetermined position, the control unit reduces a speed of travel of the self-vehicle, by deciding a deceleration amount of the speed of travel of the self-vehicle based on each of a vehicle speed set for a first lane and a vehicle speed set for a second lane, the first lane being a lane before the lane change operation and the second lane being a lane after the lane change operation, and by increasing the deceleration amount as the self-vehicle closes to the predetermined position in a lateral direction, the predetermined position is a shoulder of a road, the first lane, the second lane and the shoulder of the road are provided in this order in the lateral direction, the deceleration amount in driving on the second lane is larger than that in shifting from the first lane to the second lane, and the deceleration amount in shifting from the second lane to the shoulder of the road is larger than that in driving on the second lane.

2. The control system according to claim 1, wherein the control unit decides the deceleration amount based on one of an upper limit and a lower limit of a speed set for each lane.

3. The control system according to claim 1, wherein the control unit decides the deceleration amount based on a relative speed with respect to another vehicle positioned in the periphery of the self-vehicle.

4. The control system according to claim 1, further comprising:

a notification control unit configured to perform external notification when the second determination unit determines that the driver has not performed the operation.

5. The control system according to claim 4, wherein the external notification is performed by one of a hazard light and a car horn.

6. The control system according to claim 4, wherein the notification control unit performs external notification by communication by a communication unit after the vehicle has stopped at the predetermined position.

7. The control system according to claim 4, wherein the notification control unit stops the external notification when it is determined that the driver has performed the operation after the vehicle has stopped at the predetermined position.

8. The control system according to claim 1, wherein when the control unit detects that the driver has performed the operation while the lane change operation is performed, the control unit shifts the vehicle to the second travel state after the lane change operation has been completed.

9. The control system according to claim 1, wherein the control unit controls whether to start the lane change operation based on a peripheral environment.

10. The control system according to claim 1, further comprising:

a decision unit configured to decide the predetermined position based on an arrangement of a road on which the vehicle is traveling.

11. The control system according to claim 10, wherein the decision unit decides the predetermined position in a lane on which the self-vehicle is traveling in accordance with a travel state of the self-vehicle and information of other vehicles positioned in the periphery of the self-vehicle.

12. The control system according to claim 1, wherein
a driving distance of the self-vehicle in shifting from the first lane to the second lane is smaller than that in shifting from the second lane to the shoulder of the road to stop the self-vehicle.

13. The control system according to claim 1, wherein after the vehicle has been stopped at the predetermined position, the control unit maintains a stopped state until an operation by a human is detected.

14. A control method of a vehicle that can travel in a first travel state in which an operation by a driver is not required and in a second travel state in which the operation by the driver is required, the method comprising:
   determining whether a shift from the first travel state to the second travel state is required;
   requesting the driver to perform an operation when it is determined that the shift is required in the determining whether the shift from the first travel state to the second travel state is required;
   determining whether the driver has performed an operation in response to the request in the requesting; and
   stopping the vehicle in a predetermined position when it is determined that the driver has not performed the operation in the determining whether the driver has performed the operation in response to the request in the requesting,
   wherein in the stopping, in a case in which a lane change operation is required to stop the vehicle in the predetermined position, a speed of travel of the self-vehicle is reduced, by deciding a deceleration amount of the speed of travel of the self-vehicle based on each of a vehicle speed set for a first lane and a vehicle speed set for a second lane, the first lane being a lane before the lane change operation and the second lane being a lane after the lane change operation, and by increasing the deceleration amount as the self-vehicle closes to the predetermined position in a lateral direction,
   the predetermined position is a shoulder of a road, the first lane, the second lane and the shoulder of the road are provided in this order in the lateral direction,
   the deceleration amount in driving on the second lane is larger than that in shifting from the first lane to the second lane, and
   the deceleration amount in shifting from the second lane to the shoulder of the road is larger than that in driving on the second lane.

15. A non-transitory computer-readable storage medium storing a program to cause a computer, which is incorporated in a vehicle that can travel in a first travel state in which an operation by a driver is not required and in a second travel state in which the operation by the driver is required, to function as
   a first determination unit configured to determine whether a shift from the first travel state to the second travel state is required;
   a requesting unit configured to make an operation request to the driver when the first determination unit determines that the shift is required;
   a second determination unit configured to determine whether the driver has performed an operation in response to the request from the requesting unit; and
   a control unit configured to stop the vehicle in a predetermined position when the second determination unit determines that the driver has not performed the operation,
   wherein in a case in which a lane change operation is required to stop the vehicle in the predetermined position, the control unit reduces a speed of travel of the self-vehicle, by deciding a deceleration amount of the speed of travel of the self-vehicle based on each of a vehicle speed set for a first lane and a vehicle speed set for a second lane, the first lane being a lane before the lane change operation and the second lane being a lane after the lane change operation, and by increasing the deceleration amount as the self-vehicle closes to the predetermined position in a lateral direction,
   the predetermined position is a shoulder of a road, the first lane, the second lane and the shoulder of the road are provided in this order in the lateral direction,
   the deceleration amount in driving on the second lane is larger than that in shifting from the first lane to the second lane, and
   the deceleration amount in shifting from the second lane to the shoulder of the road is larger than that in driving on the second lane.

16. The control system according to claim 12, wherein the driving distance in shifting from the first lane to the second lane is larger than that in shifting from the first lane to the second lane in a case where the first determination unit does not determine the shift is required.

* * * * *